United States Patent [19]

Gancarz

[11] Patent Number: 5,176,024
[45] Date of Patent: Jan. 5, 1993

[54] FIREARM BARREL INNER DIAMETER TESTING ASSEMBLY

[75] Inventor: Robert M. Gancarz, Chicopee, Mass.

[73] Assignee: Colt's Manufacturing Company Inc., West Hartford, Conn.

[21] Appl. No.: 557,569

[22] Filed: Jul. 24, 1990

[51] Int. Cl.⁵ .............................................. G01B 13/08
[52] U.S. Cl. .................................................... 73/37.5
[58] Field of Search .............................. 73/37.5, 37.9; 33/DIG. 2

[56] References Cited

U.S. PATENT DOCUMENTS 2,802,276  8/1957  Straw .............................. 33/DIG. 2
4,367,646  1/1983  Allen, Sr. et al. .................... 73/37.9

Primary Examiner—Hezron E. Williams
Assistant Examiner—Raymond Y. Mah
Attorney, Agent, or Firm—Perman & Green

[57] ABSTRACT

An assembly for testing the inner diameter of a rifled barrel of a firearm and a method of manufacturing the same. The assembly has a frame with side air discharge apertures and is intended to be connected to an air gauge. The assembly has a timing sleeve that is removably mounted to the frame such that the sleeve can be replaced when it becomes worn or when the assembly is intended to be used with a barrel having a different type of rifling. The assembly also comprises a wear ring such that the wear ring and timing sleeve absorb abrasive contact in the barrel to reduce abrasive contact by the barrel on the frame.

9 Claims, 2 Drawing Sheets

FIREARM BARREL INNER DIAMETER TESTING ASSEMBLY

BACKGROUND OF THE INVENTION

1. Field of the Invention

The present invention relates to testing or measuring the size of an inner diameter of a bore and, more particularly, to an assembly for use with an air gauge to test or measure a diameter of a rifled barrel of a firearm.

2. Prior Art

All rifled barrel firearms have a series of internal lands and grooves on a helix angle that cause the bullet to spin about it's axis thereby providing flight stability. The lands make up the bore diameter and the grooves form the rifling diameter. The helix is also commonly called twist. Bore and rifling diameters can be measured throughout the entire length of the barrel with a very accurate gauging method using an air gauge. All air gauges have a gauging shank that is just small enough to fit inside the bore to be measured. Two or more air holes (orifices) strategically located on the gauging shank emit air at approximately 40 psi to the inside surface of the bore being measured. The resistance to air flow, or back pressure, is transmitted to a liquid column or electronic differential air pressure measuring device that is calibrated in thousandths, or even ten thousandths of an inch. The amount of resistance to air flow through the orifices can easily determine the exact size of the bore diameter.

In order to accurately measure the bore diameter inside the complete length of the firearm barrel, the air orifices in the gauging shank must rotate in exact proportion to the rate of twist in the barrel rifling in order to keep the air orifice holes on the center of the lands. Generally speaking, the timed rotation of the air orifices is accomplished by use of a timing sleeve that is nothing more than a short round piece of ground carbide that has grooves machined into it at the nominal twist rate which is affixed to the gauging shank of the testing spindle. A long tube and handle is connected to the gauging shank which allows inspection of the entire barrel length. Calibrated gauging or test rings are used to accurately set the high and low limits on the air gauge scale which establish the acceptable limits of the bore being measured. The test rings are slipped over the gauging shank covering the air orifices, thus creating back pressure of a known size. The part being measured should be within the upper and lower limits set on the air gauge scale.

Presently available bore air spindles generally have a gauging shank, air orifices, and a timing sleeve. The spindles are attached to a long tube and handle that can be connected to the air pressure measuring device. Generally, there are two types of bore air spindles known in the prior art. One type of spindle is a solid one piece member where all of the necessary features have been machined into it. This first type of spindle is usually made of solid carbide. The second type of spindle known in the prior art is a two piece assembly comprised of a steel gauging shank and a carbine timing sleeve permanently brazed in position on the gauging shank. Both of these prior art spindles have the tube and handle permanently brazed onto the end of the gauging shank.

During usage of the prior art spindles, the air spindle is inserted into the barrel bore and it rotates with the rifling helix (twist) throughout the entire length of the barrel. The inspector using the air gauge carefully monitors the calibrated gauge scale for any deviations that may exceed the tolerance. After hundreds of such inspections, the carbide timing sleeve will begin to wear because of the abrasive nature of barrel steel against the spindle. Some wear occurs on the outside diameter of the carbide sleeve, but it is minimal and doesn't significantly affect function or gauge accuracy. Another wear area is the outside diameter of the gauge shank in the area where it comes in contact with the lands. The most critical wear area is on the sides of the carbide grooves where the barrel lands engage the carbide sleeve grooves.

As the carbide grooves wear they become wider. Wider grooves allow the entire air spindle to move radially from one side to the other. In other words, the gauge becomes sloppy as the fit of the carbide sleeve in the rifled bore becomes loose. Excessive radial play of the spindle in the barrel will allow the air orifice of the spindle to move from the center of the rifling lands towards the edge of the lands which allows air to spill off of the lands into the grooves resulting in erroneous gauge readings. There is no practicable or economical way of repairing the prior art one or two piece spindles presently used because the combination of all three types of wear discussed above renders the prior art spindles useless and total replacement is necessary.

It is therefore an objective of the present invention to provide a new and improved spindle assembly that overcomes disadvantages in the prior art as well as provide additional features.

SUMMARY OF THE INVENTION

The foregoing problems are overcome and other advantages are provided by a new and improved air spindle assembly for testing the inner diameter of a bore and a method of manufacturing the same.

In accordance with one embodiment of the present invention an air spindle assembly for use with an air gauge for measuring a bore diameter of a rifled barrel of a firearm having lands and grooves is provided. The spindle assembly comprises a frame, a timing sleeve, and means for mounting the sleeve to the frame. The frame has a tube with an air supply conduit therein and an end member fixedly connected to the tube. The end member has an air distribution conduit therein connected to the air supply conduit and has at least two opposite discharge apertures. The timing sleeve is removably mounted to the end member and has an outer profile substantially the same as an inner profile of a section of the rifle barrel being measured. The means for mounting comprises means for stationarily, but removably mounting the sleeve to the end member such that the timing sleeve can orientate the frame in the barrel being measured with the discharge apertures substantially centered upon the lands of the barrel to obtain accurate measurements along the length of the barrel and, upon excessive wear of the timing sleeve, the sleeve can be removed and replaced with a new timing sleeve.

In accordance with another embodiment of the present invention an air spindle assembly is provided comprising a first frame member, a timing sleeve, and a timing sleeve fastener. The first frame member has a general rod shape with a first end, a second end, a conduit passing through the second end into a center portion of the first frame member, at least two apertures extending through the center portion from the conduit, and a timing sleeve rotation lock. The timing sleeve has an interior aperture that is suitably sized and shaped to slip onto the first frame member first end, an exterior profile with helical lands and grooves along its length, and a notch at one end suitably sized to receive the rotation lock and thereby prevent rotation of the sleeve on the first frame member. The timing sleeve fastener is connected to the first frame member first end to prevent the timing sleeve from longitudinal movement on the first frame member, the fastener being removable from the first frame member to allow the timing sleeve to be removed from the first frame member.

In accordance with another embodiment of the present invention, an air spindle for use with an air gauge for testing the size of a bore diameter of a rifle barrel of a firearm having lands and grooves is provided. The spindle has a frame with an air conduit having at least two discharge apertures at a testing end of the spindle wherein the improvement comprises means for removably but stationarily mounting a first timing sleeve to the frame such that the discharge apertures can be turned as the frame advances along the length of the barrel to obtain accurate measurements and, the first timing sleeve can be replaced with a second timing sleeve if the first timing sleeve becomes warn and if a second barrel having a different type of rifling is intended to be tested.

In accordance with one method of the present invention, a method of manufacturing an air spindle assembly for use with an air gauge for measuring a bore diameter of a rifle barrel of a firearm is provided comprising the steps of providing a rod shaped frame having an interior air conduit and side air discharge apertures; mounting a timing sleeve onto the frame by sliding the sleeve over a first end of the frame and aligning a keying portion of the sleeve with a keying portion of the frame to prevent the sleeve from axially rotating relative to the frame; and connecting a removable fastener to the first end of the frame to prevent the timing sleeve from unintentionally longitudinally moving on the frame such that the timing sleeve can be removed from the frame by removing the fastener and sliding the sleeve off of the frame first end.

In accordance with another embodiment of the present invention, an air spindle assembly for use with an air gauge for measuring a bore diameter of a rifle barrel of a firearm is provided. The spindle assembly comprises a frame, a timing sleeve, and a wear ring. The frame has a tube with an air supply conduit therein and an end member connected to the groove. The end member has an air distribution conduit therein connected to the air supply conduit. The timing sleeve is mounted to a forward portion of the end member and has helical lands and grooves on an exterior thereof. The wear ring is mounted to a rear portion of the end member and has an outer profile substantially the same size and shape as a center portion of the end member such that the wear ring and the timing sleeve absorb abrasive contact in the barrel to reduce abrasive contact by the barrel on the end member center portion.

In accordance with another embodiment of the present invention an inner diameter testing assembly for use in measuring an inner diameter of a rifle barrel is provided. The assembly comprises a frame, a timing sleeve, and means for positioning the timing sleeve at a predetermined position on the frame. The frame has an air supply tube and an end shank. The end shank has at least one side air discharge aperture. The timing sleeve has an interior aperture with a portion of the end shank located therethrough and an exterior profile having lands and grooves. The means for positioning the timing sleeve at a predetermined position can position the timing sleeve on the end shank such that the end shank discharge aperture is aligned with the center of a land inside the barrel when the assembly is inserted into the barrel.

In accordance with another method of the present invention, a method of replacing a timing sleeve on an air spindle assembly is provided. The method comprises the steps of removing a fastener from a first end of an end shank, the end shank having an air distribution conduit with at least one side air discharge orifice; pulling a first timing sleeve off of the shank at the first end; sliding a second timing sleeve over the first end of the shank and onto the shank; and connecting the fastener to the first end of the shank to thereby fixedly connect the second timing sleeve on the shank.

BRIEF DESCRIPTION OF THE DRAWINGS

The foregoing aspects and other features of the present invention are explained in the following description, taken in connection with the accompanying drawings, wherein.

DETAILED DESCRIPTION OF THE INVENTION

Figure 1:
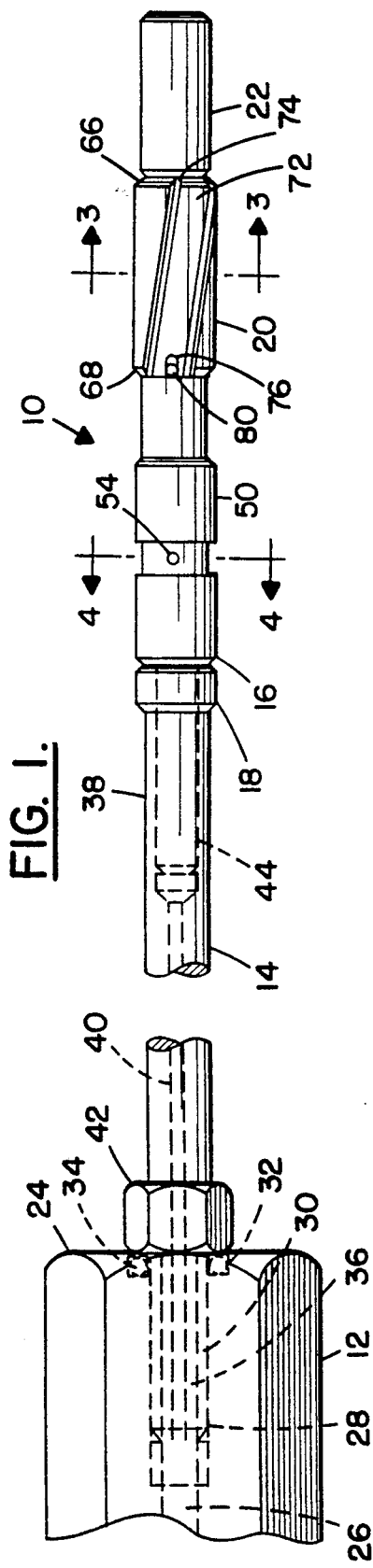
FIG. 1 is a partial plan side view of an air spindle assembly incorporating features of the present invention.
Figure 2:
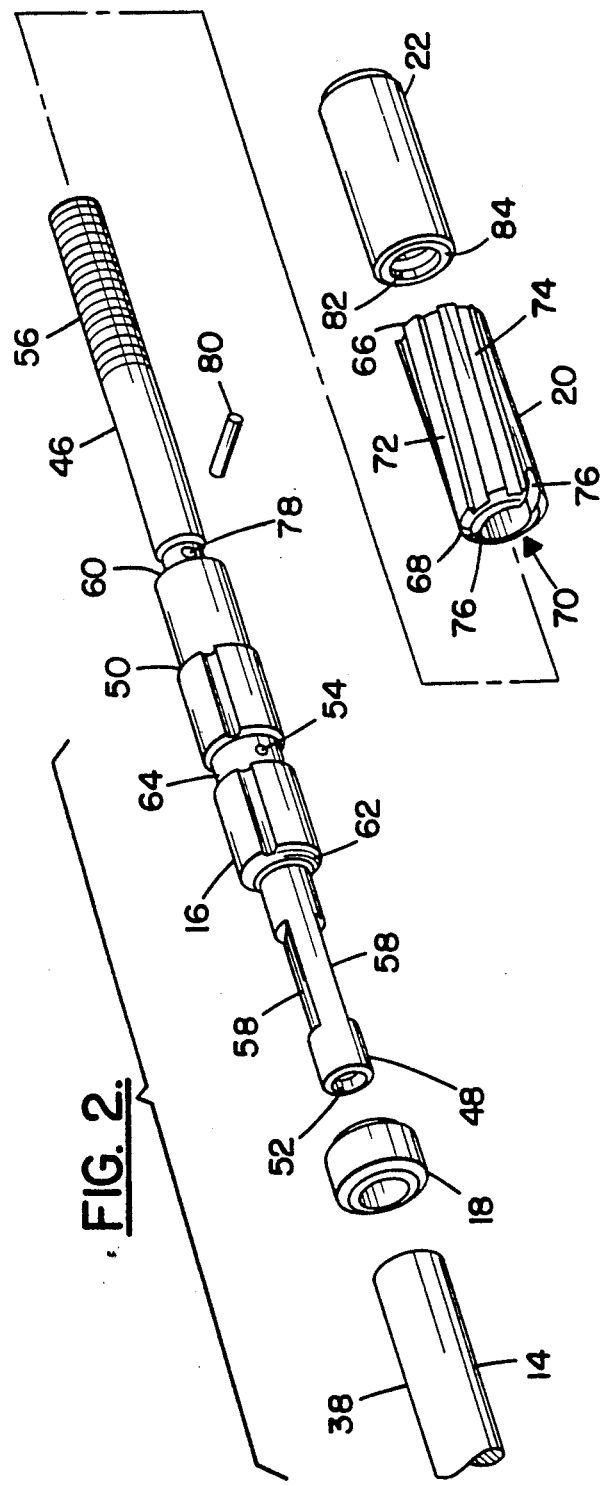
FIG. 2 is an exploded perspective view of the assembly shown in FIG. 1.

Referring to FIGS. 1 and 2, there is shown a spindle assembly 10 incorporating features of the present invention. Although the present invention will be described with reference to the spindle assembly 10 shown in the drawings, it should be understood that the present invention may be incorporated into various different embodiments. In addition, any suitable size, shape or type of elements, or any suitable type of materials can be used in an embodiment of the present invention.

The assembly 10, in the embodiment shown, is comprised of a handle 12, a tube 14, an end member shank 16, a wear sleeve 18, a timing sleeve 20, and an end fastener 22. The assembly 10 is generally intended to be connected to an air pressure measuring device (not shown) at handle 12 by a flexible tube (not shown) to supply pressurized air to the assembly 10. The measuring device can sense the resistance to air flow out of the spindle assembly 10 and display the sensed resistance in measurements as small as ten thousandths of an inch of pressure. The assembly 10, in the embodiment shown, is generally intended to be used in measuring the bore diameter of a rifled firearm barrel.

The handle 12, tube 14 and shank 16 generally form a structural frame for the assembly 10. The handle 12 is comprised of metal, such as steel, and has a first end 24, an opposite second end (not shown), and a conduit 26 therebetween. The second end (not shown) has suitable means for connecting the air pressure measuring device flexible tube (not shown) thereto such that pressurized air can be supplied to the conduit 26. The first end 24 of the handle 12 also comprises an enlarged section 28 of the conduit 26 having threads 30 and a seat 32 for receiving a seal 34, such as an O-Ring seal.

The tube 14 is also generally comprised of metal, such as steel, with a first end 36, an opposite second end 38, a conduit 40 therebetween and a seal compression nut 42 mounted to the tube 14 at its first end 36. The first end 36 has threads and can be screwed into the threads 30 in enlarged section 28 of the handle conduit 26. The compression nut 42 is also screwed onto the threads of the tube first end 36, but prior to connection of the tube 14 to the handle 12. As the tube first end 36 is screwed into the handle 12, the compression nut 42 squeezes against the seal 34 to form a seal between the handle 12 and tube 14. The pressurized air can thus travel from the handle conduit 26 into the tube conduit 40. The exterior of the tube 14 is preferably marked with distance indicia (not shown) relative to air discharge orifices in the shank 16 as will be described below. The second end 38 of the tube 14 has an enlarged section 44 in its conduit 40 for receiving an end 48 of the shank 16. In the embodiment shown, the shank end 48 is positioned and glued inside the tube enlarged section 44. In a preferred embodiment the glue is capable of being melted and the tube 14 and shank 16 separated by applying mild heat to the connection. However, it should be understood that any suitable means could be used to fix the tube 14 with the shank 16 and the handle 12.

Figure 4:
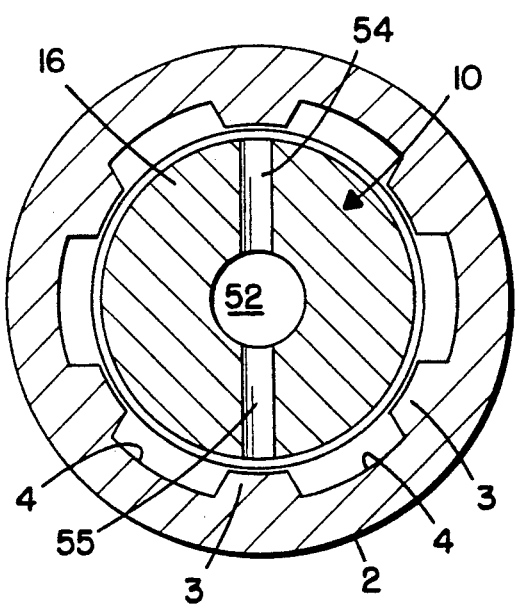
FIG. 4 is a cross sectional view as in FIG. 3 taken along a section at the air discharge apertures of the assembly shown in FIG. 1.

The end member shank 16 is also generally comprised of metal, such as steel, and has a first end 46, second end 48, a middle section 50 therebetween, and an air distribution system comprised of a conduit 52 extending from the second end 48 into the middle section 50, and air discharge orifices 54 and 55 extending from the conduit 52 to an exterior surface of the middle section 50 (see FIG. 4). In the embodiment shown, the first end 46 has a threaded section 56. The second end 48, in the embodiment shown, has recessed areas 58 in its outer perimeter. These recessed areas 58 are generally provided to allow a greater amount of glue to be placed between the outer perimeter of shank second end 48 and inner diameter of tube conduit enlarged section 44 for a stronger bond therebetween.

The middle section 50, in the embodiment shown, has the largest outer perimeter of the shank 16 with a first ledge 60, a second ledge 62 and a center recessed section 64. The first ledge 60 generally establishes the boundary between the shank first end 46 and the middle section 50. The second ledge 62 generally establishes the boundary between the shank second end 48 and the middle section 50. In the embodiment shown, the wear sleeve 18 is slid onto the shank second end 48 prior to connection of the tube 14 to the shank 16 and sandwiched between the tube second end 38 and the second ledge 62. In a preferred embodiment of the invention, the wear sleeve 18 is comprised of carbide. However, in an alternate embodiment of the invention the wear sleeve 18 need not be provided. In the embodiment shown, the wear sleeve 18 is provided with an outer profile and size, or outer diameter, substantially the same as the outer profile of the largest portion of the shank middle section 50. The sleeve 18 is generally intended to make contact with the lands in a rifled barrel to reduce abrasive wear on the shank middle section 50. As noted above, the tube 14 is glued to the shank 16 by heat sensitive glue and, therefore, by heating the glue, the tube 14 can be removed from the shank 16. Thus, the wear sleeve 18 can be removed if it becomes worn and replaced with a new wear sleeve. The tube 14 can then be reglued to the shank 16. This can significantly prolong the working life of the shank 16 by virtually eliminating the risk of having to replace the shank due to abrasive wear of the barrel lands on the shank 16.

Referring also to FIG. 4, there is shown a cross-sectional view of the shank 16 taken along line 4—4 in FIG. 1 inside the bore of a rifled barrel 2. The barrel 2 has helical lands 3 and grooves 4 along its length. The distance between two opposite lands 3 is the bore diameter that is intended to be tested by the spindle assembly 10. As noted in FIG. 4, with the forward portion of the assembly 10 located in the barrel 2, the discharge apertures 54 and 55 of the assembly 10 are centered upon two opposite lands 3. The air pressure measuring device (not shown) can measure the resistance to the flow of air out of the apertures 54 and 55, the flow of air being partially restricted to the close proximity of the ends of the apertures 54 and 55 with the lands 3, and indicate what the bore diameter is between the two lands being tested. Because, in the embodiment shown, the barrel has six lands 3, this process would be repeated two additional times, once for each of the other two pairs of opposing lands. The distance indicia (not shown) on the tube can be read by a tester in the event a defect, such as too large or too small a bore diameter, is detected to indicate the exact length down the barrel 2 that the defect occurs. Thus, if a defect is detected, the barrel 2 can be sent to be corrected with precise remarks from the tester as to where the defect occurs.

Figure 3:
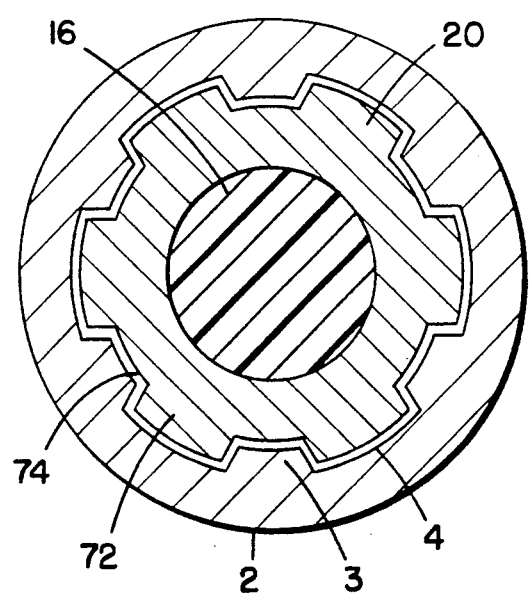
FIG. 3 is a cross sectional view of a rifled barrel with the assembly shown in FIG. 1 therein taken along a section at the timing sleeve of the assembly.

As noted above, in order to obtain accurate test results, it is necessary to keep the discharge apertures 54 and 55 located over the lands 3. Because of the helical twist of the lands 3 along the length of the barrel 2, the timing sleeve 20 is provided to properly spin the assembly 10 as it moves down the length of the barrel 2 such that the apertures 54 and 55 remain located over the lands 3. The timing sleeve 20 is generally comprised of carbide and has a general cylinder shape with a first end 66, a second end 68 and a center aperture 70 therebetween. The center aperture 70 is suitably sized and shaped to fit on the shank first end 46. The outer profile of the timing sleeve 20 is comprised of lands 72 and grooves 74 having a helical twist along its length. The helical twist is provided as same as the twist in the barrel and, the timing sleeve lands 72 and grooves 74 are suitably sized and shaped to be received in the barrel 2 as shown in FIG. 3 (Note: the spacing between the sleeve 20 and the inside of the barrel 2 is exaggerated in this figure to help show that a spacing does exist). Located at the sleeve second end 68 are two notches 76 intended to cooperate with a portion of the shank to prevent axial rotation of the sleeve 20 relative to the shank 16. However, although notches 76 are described in this embodiment, any suitable type of means to prevent axial rotation of the sleeve 20 on the shank 16 could be provided. The shank 16 has a keying portion to cooperate with the keying notches 76 of the sleeve 20.

In the embodiment shown, the keying portion of the shank 16 is comprised of a pin hole 78 and a pin 80. The pin hole 78 is located in the first end 46 of the shank 16 proximate the first ledge 60. The hole 78 extends through the width of the shank. The pin 80 is preferably made of metal and has a length slightly larger than the length of the pin hole 78. The pin 80 is press fit into the hole 78 such that its two ends extend from opposite sides of the hole 78. When the sleeve 20 is mounted on the shank first end 46 it is aligned at a predetermined orientation on the shank 16 such that the notches 76 are aligned with the ends of the pin 80. Thus, the second end 68 of the timing sleeve 20 can pass beyond the ends of the pin 80 with the ends of the pin being snuggly received in the notches 76. The second end 68 of the sleeve 20 is thus able to make contact with first ledge 60 of the shank 16.

In order to prevent the timing sleeve 20 from longitudinally moving on the shank 16, the assembly 10 is provided with an end fastener 22. The end fastener 22, in the embodiment shown, is a tubular member comprised of metal and having an interior channel 82 with threads. The threads in the channel 82 match the threads on the threaded section 56 of the shank first end 46. The end fastener 22 can thus be screwed onto the threaded section 56. The end fastener 22 has a sleeve end 84 that can abut against the first end 66 of timing sleeve 20. Thus, as the end fastener 22 is screwed onto the shank first end 46, the timing sleeve 20 is longitudinally and stationarily sandwiched between the shank first ledge 60 and the end fastener sleeve end 84. However, any suitable type of end fastener or means for removably mounting the timing sleeve 20 can be provided.

As noted above, the timing of the turning of the spindle assembly 10 as it advances along the length of a rifled barrel is accomplished by the timing sleeve and is very important in order to obtain accurate measurements of bore diameters. In the embodiment shown, this is accomplished by a precise placement of the pin hole 78 and pin 80 relative to the discharge apertures 54 and 55 and, the precise placement of the notches 76 in the timing sleeve 20 relative to the lands 72 and grooves 74 on the timing sleeve 20. In addition, the precise placement of the second end 68 of the timing sleeve 20 against the first shank ledge 60 is also required to insure that the orifices 54 and 55 are initially aligned with the centers of lands inside barrels. As the spindle assembly 10 is pushed by a tester down the length of a barrel, the timing sleeve 20 uses its interlocking axial rotation lock with the shank 16, via pin 80, hole 78 and notches 76, to axially rotate the entire spindle assembly 10 as it moves in the barrel. Thus, the orifices 54 and 55 are retained in alignment with the barrel lands.

As noted above, eventually the timing sleeve 20 will wear due to abrasive contact with the inside of barrels. Unlike in the prior art wherein the entire spindle or spindle assembly had to be discarded, the present invention provides the means to simply and easily replace the timing sleeve 20 with a new timing sleeve. When excessive wear of the timing sleeve 20 is detected by a tester, usually signified by excessive radial play of the spindle assembly 10 in a barrel, the tester first removes the end fastener by merely unscrewing it from the end of the shank 16. The tester can then merely pull on the timing sleeve and it can slide off of the shank at the first end 46. A new timing sleeve can then be slid over the first end of the shank and onto the shank. Then, the tester merely aligns the timing sleeve notches 76 with the ends of the pin 80 and reconnects the end fastener to the shank first end to thereby fixedly, but removably connect the second timing sleeve to the shank. The assembly 10 is once again ready for use at only a fraction of the cost of what a new spindle would have cost. In addition, because the timing sleeve can be replaced, different type of timing sleeves having different degrees of twist can be interchanged such that a single spindle assembly can test different types of rifled barrels having different degrees of twist.

Let it be understood that the the foregoing description is only illustrative of the invention. Various alternatives and modifications can be devised by those skilled in the art without departing from the spirit of the invention. Accordingly, the present invention is intended to embrace all such alternatives, modifications and variances which fall within the scope of the appended claims.

What is claimed is:

1. An air spindle assembly for use with an air gauge for measuring a bore diameter of a rifled barrel of a firearm having lands and gloves, the spindle assembly comprising:

a frame having a tube with an air supply conduit therein and an end member fixedly connected to said tube, said end member having an air distribution conduit therein connected to said air supply conduit and having at least two opposite discharge apertures;

a timing sleeve removably mounted to said end member, said sleeve having an outer profile substantially the same as an inner profile of a section of the rifled barrel being measured; and means for stationarily, but removably mounting said sleeve to said end member such that said timing sleeve can orientate said frame in the barrel being measured with said discharge apertures substantially centered upon the lands of the barrel to obtain accurate measurements along the length of the barrel and, upon excessive wear of said timing sleeve, said sleeve can be removed and replaced with a new timing sleeve.

2. An assembly as in claim 1 wherein said means for mounting comprises threads on a first end of said end member and an end fastener adapted to be screwed onto said threads to sandwich said timing sleeve between said end fastener and a ledge of said end member.

3. An assembly as in claim 1 wherein said means for mounting comprises a keying portion on said timing sleeve and a keying portion on said end member that cooperate to prevent axial rotation of said timing sleeve relative to said end member.

4. An assembly as in claim 3 wherein said end member keying portion comprises said end member having a hole therethrough with a pin supported in said hole, said pin having ends extending past the outer profile of the end member.

5. An assembly as in claim 3 wherein said timing sleeve keying portion comprises slots at a rear end of said timing sleeve.

6. An assembly as in claim 1 wherein said end member has a reduced outer profile proximate said discharge apertures.

7. An assembly as in claim 1 wherein said tube is glued to said end member.

8. An assembly as in claim 1 wherein said tube has a connector for connecting the tube to an air gauge.

9. An assembly as in claim 1 further comprising a wear sleeve connected to said end member proximate the connection of the tube to the end member.

* * * * *